United States Patent
Minezawa et al.

(12)

(10) Patent No.: US 9,741,243 B2
(45) Date of Patent: Aug. 22, 2017

(54) REMOTE CONTROL SYSTEM, DEVICE CONTROL APPARATUS AND PROGRAM

(71) Applicants: Satoshi Minezawa, Tokyo (JP); Masaaki Yabe, Tokyo (JP); Masayuki Komatsu, Tokyo (JP); Tadaaki Sakamoto, Tokyo (JP); Yuki Ogawa, Tokyo (JP); Shinji Nakamura, Tokyo (JP); Shiro Suzuki, Tokyo (JP)

(72) Inventors: Satoshi Minezawa, Tokyo (JP); Masaaki Yabe, Tokyo (JP); Masayuki Komatsu, Tokyo (JP); Tadaaki Sakamoto, Tokyo (JP); Yuki Ogawa, Tokyo (JP); Shinji Nakamura, Tokyo (JP); Shiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 42 days.

(21) Appl. No.: 14/761,785

(22) PCT Filed: Jan. 22, 2013

(86) PCT No.: PCT/JP2013/051158
§ 371 (c)(1),
(2) Date: Jul. 17, 2015

(87) PCT Pub. No.: WO2014/115242
PCT Pub. Date: Jul. 31, 2014

(65) Prior Publication Data
US 2015/0364036 A1    Dec. 17, 2015

(51) Int. Cl.
*G08C 17/02*    (2006.01)
*H04Q 9/00*    (2006.01)
*H04N 5/232*    (2006.01)

(52) U.S. Cl.
CPC ......... *G08C 17/02* (2013.01); *H04N 5/23206* (2013.01); *H04Q 9/00* (2013.01);
(Continued)

(58) Field of Classification Search
CPC ............... G08C 17/02; G08C 2201/50; G08C 2201/93; G08C 2201/30; H04Q 9/00; H04N 5/23206
See application file for complete search history.

(56) References Cited

U.S. PATENT DOCUMENTS

| 2003/0131089 A1 | 7/2003 | Yamamoto et al. |
| 2006/0238316 A1 | 10/2006 | Taki et al. |

(Continued)

FOREIGN PATENT DOCUMENTS

| JP | S60-169264 A | 9/1985 |
| JP | 62-125250 A | 6/1987 |

(Continued)

OTHER PUBLICATIONS

Machine Translation of JP 62-125250.*
(Continued)

*Primary Examiner* — Nabil Syed
(74) *Attorney, Agent, or Firm* — Posz Law Group, PLC

(57) ABSTRACT

A device control apparatus acquires information on the environment surrounding devices from an environment acquisition sensor. The device control apparatus determines, on the basis of the acquired environment information, whether the devices can be remotely controlled safely. When remote operation instruction data is received from a terminal apparatus via an external network (N2), the device control apparatus generates a control signal for controlling devices to be operated and transmits the generated control signal to
(Continued)

| DEVICE ID | DEVICE NAME | SAFETY LEVEL | MONITORING PERIOD | POWER RATING | DATE MADE | MONITORING SENSOR ID | REMOTE OPERATION POSSIBILITY INFORMATION | UPDATE DATE, TIME |
|---|---|---|---|---|---|---|---|---|
| A1 | GAS STOVE | 1 | 5 SEC | – | 7/28/1998 | S1,S2,S3 | OPERATION NOT POSSIBLE | 9/15/2012; 12:25:35 |
| A2 | IH COOKER | 1 | 5 SEC | 4800W | 6/15/2010 | S1,S4 | OPERATION POSSIBLE | 9/15/2012; 12:25:35 |
| A3 | RICE COOKER | 2 | 30 SEC | 1200W | 5/15/2012 | S5 | OPERATION POSSIBLE | 9/15/2012; 12:25:30 |
| A4 | A/C | 3 | 5 MIN | 500W | 12/1/2009 | S5 | OPERATION POSSIBLE | 9/15/2012; 12:25:00 |
| .. | .. | .. | .. | .. | .. | .. | .. | .. | such devices via an in-house network only in a case where it is determined that such devices can be remotely controlled safely.

14 Claims, 9 Drawing Sheets

(52) U.S. Cl.
CPC ..... *G08C 2201/30* (2013.01); *G08C 2201/50* (2013.01); *G08C 2201/93* (2013.01)

(56) References Cited

U.S. PATENT DOCUMENTS

| | | | | |
|---|---|---|---|---|
| 2007/0293190 | A1* | 12/2007 | Ota | G08C 17/00 |
| | | | | 455/404.2 |
| 2011/0093093 | A1* | 4/2011 | Yang | G06F 13/387 |
| | | | | 700/12 |
| 2015/0180880 | A1* | 6/2015 | Nakano | G08C 17/02 |
| | | | | 726/4 |

FOREIGN PATENT DOCUMENTS

| | | |
|---|---|---|
| JP | 01-227564 A | 9/1989 |
| JP | 2000-253165 A | 9/2000 |
| JP | 2000-267892 A | 9/2000 |
| JP | 2001-339773 A | 12/2001 |
| JP | 2002-300668 A | 10/2002 |
| JP | 2005-005939 A | 1/2005 |
| JP | 2006-093782 A | 4/2006 |
| JP | 2006-302018 A | 11/2006 |

OTHER PUBLICATIONS

International Search Report of the International Searching Authority mailed Mar. 5, 2013 for the corresponding international application No. PCT/JP2013/051158 (and English translation).

Office Action mailed Aug. 9, 2016 issued in corresponding JP patent application No. 2014-558312 (and English translation).

* cited by examiner

FIG. 4

| DEVICE ID | DEVICE NAME | SAFETY LEVEL | MONITORING PERIOD | POWER RATING | DATE MADE | MONTIORING SENSOR ID | REMOTE OPERATION POSSIBILITY INFORMATION | UPDATE DATE TIME |
|---|---|---|---|---|---|---|---|---|
| A1 | GAS STOVE | 1 | 5 SEC | — | 7/28/1998 | S1,S2,S3 | OPERATION NOT POSSIBLE | 9/15/2012; 12:25:35 |
| A2 | IH COOKER | 1 | 5 SEC | 4800W | 6/15/2010 | S1,S4 | OPERATION POSSIBLE | 9/15/2012; 12:25:35 |
| A3 | RICE COOKER | 2 | 30 SEC | 1200W | 5/15/2012 | S5 | OPERATION POSSIBLE | 9/15/2012; 12:25:30 |
| A4 | A/C | 3 | 5 MIN | 500W | 12/1/2009 | S5 | OPERATION POSSIBLE | 9/15/2012; 12:25:00 |
| ⋮ | ⋮ | ⋮ | ⋮ | ⋮ | ⋮ | ⋮ | ⋮ | ⋮ |

FIG. 5

| SENSOR ID | SENSOR TYPE | ACQUIRED ENVIRONMENT INFORMATION | DATE, TIME ACQUIRED |
|---|---|---|---|
| S1 | HUMAN PRESENCE | PERSON DETECTED | 9/15/2012 12:25:00 |
| S2 | HEAT | 20° C | 9/15/2012 12:25:00 |
| S3 | CAMERA | IMAGE A | 9/15/2012 12:25:00 |
| S4 | HEAT | 22° C | 9/15/2012 12:25:00 |
| S5 | CAMERA | IMAGE B | 9/15/2012 12:25:00 |
| .. | .. | .. | .. |

FIG. 10

DEVICE INFORMATION DISPLAY

DEVICE NAME: RICE COOKER

REMOTE OPERATION: POSSIBLE

DEVICE NEIGHBORHOOD INFORMATION:
SURROUNDING TEMPERATURE (23°C)

| NEXT DEVICE | PREVIOUS DEVICE |

REMOTE CONTROL SYSTEM, DEVICE CONTROL APPARATUS AND PROGRAM

CROSS REFERENCE TO RELATED APPLICATION

This application is a U.S. national stage application of PCT/JP2013/051158 filed on Jan. 22, 2013, the contents of which are incorporated herein by reference.

TECHNICAL FIELD

The present disclosure relates to a remote control system, device control apparatus and program for remotely controlling devices.

BACKGROUND ART

Technology whereby a user can remotely operate various devices at a residence using a mobile terminal and/or the like possessed by the user has been known from before. However, when remotely operating devices, the status of the device being operated and the surroundings thereof are unclear to the user. Accordingly, there are fears that a fire could be caused by starting a device such as an electric stove and/or the like through remote operation despite the fact that a highly flammable object is nearby, which poses a problem in terms of safety.

In response to this problem, Patent Literature 1 for example discloses a system configured to transmit to the mobile terminal an image taken of the inside of a building, when the apparatus to be operated in the building is remotely operated from the mobile terminal With this system, it is possible for the user of the mobile terminal to confirm the status of the surroundings of the apparatus to be operated from the image received, thereby making it possible to remotely operate devices with a certain degree of safety.

CITATION LIST

Patent Literature

Patent Literature 1: Unexamined Japanese Patent Application Kokai Publication No. 2006-93782

SUMMARY OF INVENTION

Technical Problem

With the system disclosed in Patent Literature 1, the user must determine whether or not the apparatus to be operated is in a state as to be remotely operated safely, from images inside the building received at the time of remote operation. Consequently, in cases when there is an error in the user's determination or when the user erroneously operates the mobile terminal, there are concerns that the apparatus to be operated will be remotely operated despite the surroundings being in a dangerous state.

The present disclosure was created in order to resolve the above-described problems, and it is an objective of the present disclosure to provide a remote control system, device control apparatus and program that can remotely operate devices safely.

Solution to Problem

In order to achieve the above objective, the remote control system according to the present disclosure is a remote control system comprising a terminal apparatus and a device control apparatus, wherein:

the terminal apparatus comprises:
communication means for accomplishing data communication conforming to a prescribed communication format with the device control apparatus;
operation receiving means for receiving remote operation from a user for a device placed in a residence; and
operation command data transmission means for generating remote operation command data including command contents indicating the remote operation received by the operation receiving means, and transmit the generated remote operation command data to the device control apparatus via the communication means; and the device control apparatus comprises:
terminal communication means for accomplishing data communication conforming to a prescribed communication format with the terminal apparatus;
device communication means for accomplishing data communication with the device via a prescribed network;
environment acquisition means for acquiring the environment surrounding the device;
operation possibility determination means for determining whether or not it is possible to remotely operate the device safely, on the basis of the environment acquired by the environment acquisition means; and
device control means for generating a control signal for the device and transmit the generated control signal to the device via the device communication means on the basis of the command contents included in the remote operation command data received, when the operation possibility determination means determines that remote operation is possible upon the terminal communication means receiving the remote operation command data for the terminal apparatus, and to not generate or transmit the control signal when the operation possibility determination means determines that remote operation is not possible.

Advantageous Effects of Invention

With the present disclosure, the environment surrounding the device is acquired and a determination is made as to whether or not the device can be remotely operated safely. Furthermore, when remote operation command data is received from a terminal apparatus, the device is remotely operated when it is determined that remote operation is safely possible, and the device is not remotely operated when it is determined that remote operation is not safely possible. Accordingly, it is possible to remotely operate the device safely.

BRIEF DESCRIPTION OF DRAWINGS

FIG. 4 is a drawing showing an example of information stored in a device database;

FIG. 5 is a drawing showing an example of information stored in an environment database;

FIG. 10 is a drawing showing an example of a device information display screen.

DESCRIPTION OF EMBODIMENTS

Figure 1:
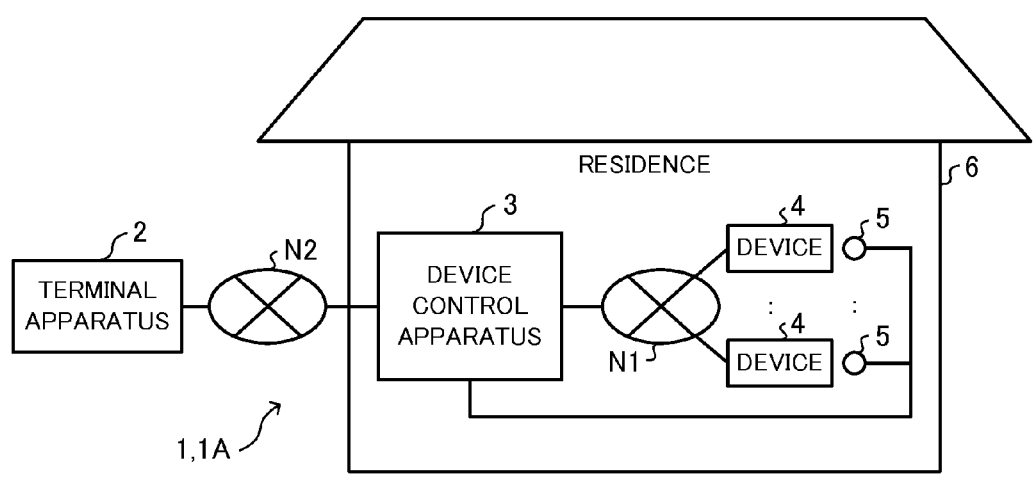
FIG. 1 is a drawing showing the entire composition of a remote control system according to first and second exemplary embodiments of the present disclosure.

Below, exemplary embodiments of the present disclosure are described in detail with reference to the drawings. Components that are the same or equivalent in the drawings are labeled with the same reference signs.

(First Exemplary Embodiment)

A remote control system 1 according to a first exemplary embodiment of the present disclosure is described with reference to FIG. 1. This remote control system 1 is a system for remotely operating various devices 4 used in a residence 6 in a typical home.

The devices 4 are, for example, air conditioners, rice cookers, IH cookers, gas stoves and/or the like. The devices 4 are connected to an in-house network N1 built in the residence 6 so as to be capable of communicating by wire or wirelessly. The in-house network N1 is, for example, a network conforming to ECHONET.

As shown in FIG. 1, the remote control system 1 comprises a terminal apparatus 2 and a device control apparatus 3. The terminal apparatus 2 and the device control apparatus 3 are connected so as to be able to communicate via an external network N2 such as the Internet and/or the like.

Figure 2:
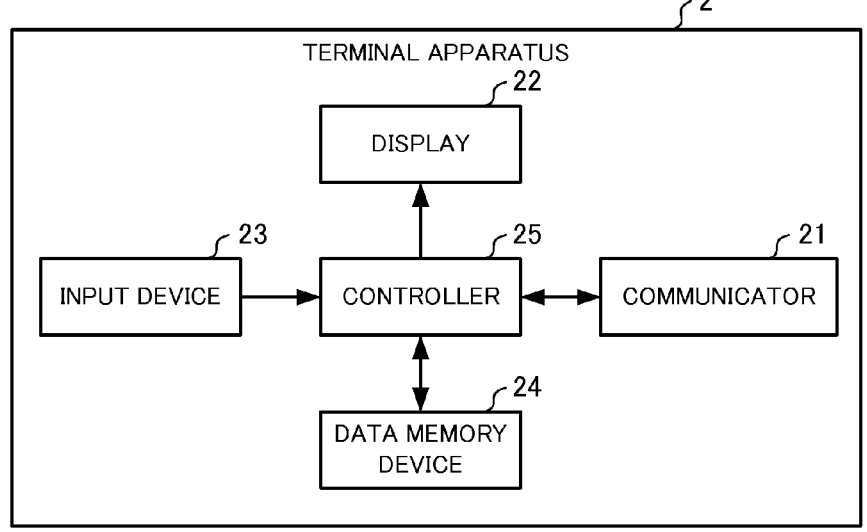
FIG. 2 is a block diagram showing the composition of a terminal apparatus according to the first exemplary embodiment.

The terminal apparatus 2 is, for example, a terminal apparatus such as a smartphone and/or the like. As shown in FIG. 2, the terminal apparatus 2 comprises a communicator 21, a display 22, an input device 23, a data memory device 24 and a controller 25.

The communicator 21 comprises a prescribed wireless communication interface and accomplishes data communication conforming to a prescribed wireless communication format with the device control apparatus 3, under control of the controller 25. The display 22 comprises a liquid crystal display device and/or the like and displays a user operation screen and/or the like for remote operation of the devices 4, under control of the controller 25.

The input device 23 comprises a touch panel, a touch pad and/or the like, and accomplishes a process for receiving operation input from a user. For example, when a touch panel is utilized, a transparent, planar electrostatic capacitance sensor for detecting changes in the electrostatic capacitance is mounted on top of the liquid crystal display device. When contact (pressure) on the touch screen (to the user, the display screen of the liquid crystal display device) by the user's finger or a special pen and/or the like is detected by the electrostatic capacitance sensor, information about the position thereof (coordinate data) is output to the controller 25. The controller 25 determines the user's operation content, on the basis of this position information. When the user accomplishes an input operation via the input device 23, a signal corresponding to that operation content is output to the controller 25.

The data memory device 24 serves the role of a so-called secondary memory apparatus (supplementary memory apparatus), and for example comprises readable and writeable non-volatile semiconductor memory and/or the like, such as flash memory and/or the like. The data memory device 24 stores data such as an overview of remotely operable devices 4, an overview of operation contents of the devices 4 and/or the like, and data showing the working status of the devices 4. In addition, the data memory device 24 stores various types of control programs including programs related to remote operation, and various types of tables used when executing the programs, and/or the like.

The controller 25 comprises a CPU (Central Processing Unit), a ROM (Read Only Memory), a RAM (Random Access Memory) and/or the like (none shown in the drawings), and accomplishes control of the terminal apparatus 2 as a whole. The controller 25 controls the various components and executes prescribed processes in accordance with the programs stored in the data memory device 24.

Returning to FIG. 1, the device control apparatus 3 is positioned at a prescribed location in the residence 6, and accomplishes communication with the terminal apparatus 2 via the external network N2. In addition, the device control apparatus 3 accomplishes communication with the devices 4 in the residence via the in-house network N1. The device control apparatus 3, for example, is a system controller for controlling the devices 4 in the residence.

In addition, the device control apparatus 3 is connected to the various environment acquisition sensors 5 positioned surrounding the devices 4 in the residence. The various environment acquisitions sensors 5 are sensors for acquiring the environment in the neighborhood of the devices 4, and for example are human presence sensors, heat sensors, cameras and/or the like. In addition, the various environment acquisition sensors 5 are each endowed with a unique sensor ID. The various environment acquisition sensors 5 output information indicating the acquired environment (absence or presence of people, temperature, image data and/or the like) to the device control apparatus 3 along with their own apparatus ID as occasion warrants.

Figure 3:
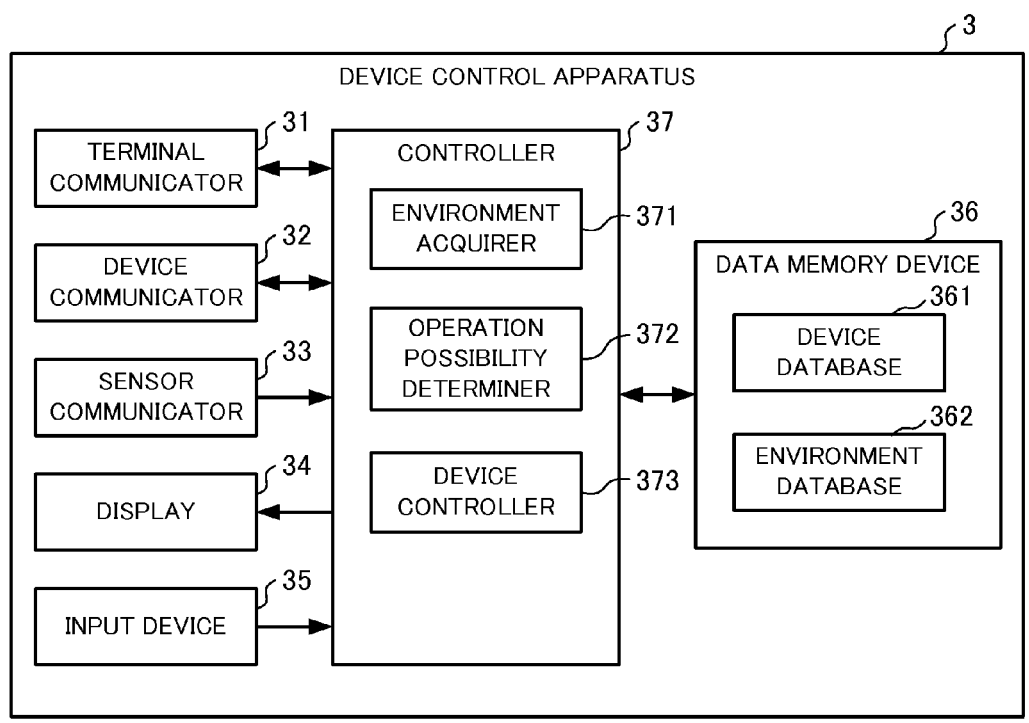
FIG. 3 is a block diagram showing the composition of a device control apparatus according to the first exemplary embodiment.

As shown in FIG. 3, the device control apparatus 3 comprises a terminal communicator 31, a device communicator 32, a sensor communicator 33, a display 34, an input device 35, a data memory device 36 and a controller 37.

The terminal communicator 31 comprises a prescribed wireless communication interface, and accomplishes data communication conforming to a prescribed wireless communication format with the terminal apparatus 2, via the external network N2, under control of the controller 37. The device communicator 32 comprises a communication interface such as a LAN card and/or the like, and connects by wire or wirelessly to the in-house network N1 so as to be capable of communication and accomplishes data communication via the internal network N1 with the devices 4, under control of the controller 37. The sensor communicator 33 is an interface for receiving information indicating the environment, from the environment acquisition sensors 5.

The display 34 comprises a liquid crystal display device and/or the like, and displays various types of screens for user operation and observation screens showing the working status and/or the like of the devices 4, under control of the controller 37. The input device 35 comprises a touch panel, a touch pad and/or the like, and accomplishes a process for receiving operation input from a user.

The data memory device 36 serves the role of a so-called secondary memory apparatus (auxiliary memory apparatus), and for example comprises readable and writeable non-volatile semiconductor memory and/or the like, such as flash memory and/or the like. The data memory device 36 stores various types of data and programs for controlling the devices 4. In addition, the data memory device 36 is provided with a device database 361 and an environment database 362.

As shown in FIG. 4, in the device database 361 are stored a device ID, device name, safety level, observation period, power rating, date manufactured, monitoring sensor ID, remote operation possibility information, update date and time, and/or the like for each device 4.

The device ID is an ID for communication assigned to each of the devices 4. The device name indicates the general name or nickname of the device 4, such as "rice cooker", "air conditioner" and/or the like, and is used in the device control apparatus 3 and the terminal apparatus 2 so as to be recognizable by the user when displaying information about the devices 4.

The safety level indicates a level related to the safety of the device 4. In this exemplary embodiment, the safety level is expressed with numerical values, with larger values of the safety level indicating greater possibility of remotely operating the device 4 safely. In general, low safety levels are set for devices 4 with a high flammability, a heat source that is exposed or a high possibility of short circuits. The safety level is information set in advance in accordance with the type of device 4.

The monitoring period indicates the period during which a below-described operation possibility determination process is accomplished at fixed intervals. In this exemplary embodiment, the monitoring period is set in accordance with the safety level. Specifically, the monitoring period is set so as to be longer for devices 4 with high safety levels. For example, in the example of FIG. 4, in the case of a safety level of "1" the monitoring period is "5 seconds", in the cases of a safety level of "2" the monitoring period is set to "30 seconds" and in the case of a safety level of "3" the monitoring period is set to "5 minutes".

The power rating indicates the value of the power rating of the device 4. The manufacturing date indicates the day, month and year the device 4 was manufactured. The power rating and the manufacturing date are information set in advance on the basis of a manual and/or the like of the device 4.

The monitoring sensor ID indicates the sensor ID of the environment acquisition sensor 5 used for monitoring the environment surrounding the device 4. When multiple environment acquisition sensors 5 are used in order to monitor the environment surrounding the device 4, multiple sensor IDs are set in the monitoring sensor ID. For example, from the example of FIG. 4 it can be seen that three environment acquisition sensors 5 having sensor IDs of S1, S2 and S3 are used in order to monitor the environment surrounding the gas stove. In addition, a single environment acquisition sensor 5 may be used to monitor multiple devices 4. For example, from the example of FIG. 4 it can be seen that the environments surrounding the rice cooker and the air conditioner are monitored by the environment acquisition sensor 5 having a sensor ID of S5.

The remote operation possibility information indicates whether or not it is possible to remotely operate the device 4 safely. The update date and time indicates the date and time when the entry in the device database 361 was updated.

The environment database 362 stores information related to the environment in the residence acquired by the various environment acquisition sensors 5. The information in the environment database 362 is updated as occasion warrants by a process of a below-described environment acquirer 371. Specifically, as shown in FIG. 5, a sensor ID, sensor type, acquired environment information, and acquisition date and time are stored in the environment database 362 for each of the environment acquisition sensors 5.

The sensor ID is an ID for uniquely identifying the various environment acquisition sensors 5. The sensor type indicates the type of environment acquisition sensor 5. In this exemplary embodiment, the sensor type includes "human presence" indicating a human presence sensor, "image" indicating a camera and "heat" indicating a heat sensor.

The acquired environment information is information indicating the environment acquired by the environment acquisition sensor 5. For example, when the environment acquisition sensor 5 is a human presence sensor, the acquired information environment information is information indicating whether or not a person was detected by the human presence sensor. In addition, when the sensor is a heat sensor, the acquired environment information is the value of the temperature measured by this heat sensor. In addition, when the sensor is a camera, the acquired environment information indicates image data of an image photographed by this camera. The acquired environment information is updated to the newest information as occasion warrants, each time the environment acquisition sensor 5 acquires the environment. The acquisition date and time indicates the date and time the environment acquisition sensor 5 acquired.

Returning to FIG. 3, the controller 37 comprises a CPU, ROM, RAM and/or the like (all unrepresented), and accomplishes control of the device control apparatus 3 as a whole. In addition, the controller 37 functionally comprises an environment acquirer 371, an operation possibility determiner 372 and a device controller 373. The functions of these constituent units are realized by the CPU and/or the like executing the above-described programs stored in the data memory device 36.

The environment acquirer 371 acquires the environment surrounding the device 4 at regular intervals (for example, every 30 seconds), from the environment acquisition sensors 5, via the sensor communicator 33, and updates the information stored in the environment database 362.

The operation possibility determiner 372 executes an operation possibility determination process that determines whether or not it is possible to remotely operate the device 4 safely on the basis of the environment acquired by the environment acquisition sensors 5, at the set monitoring period, for each device 4. Details of the operation possibility determination process are described below.

The device controller 373 determines whether or not remote operation of the device 4 targeted for operation is possible by referencing the device database 361, upon receiving remote operation command data included in which is remote command content related to operation of the device 4. Furthermore, when remote operation is possible, the device controller 373 generates a control signal for operation of the device 4, on the basis of the operation command contents, and executes a device control process transmitted to the device 4, via the device communicator 32. Details of the device control process are described below.

Next, the actions of the processes executed by the controller 37 of the device control apparatus 3 configured as described above are explained.

(Operation Possibility Determination Process)

Figure 6:
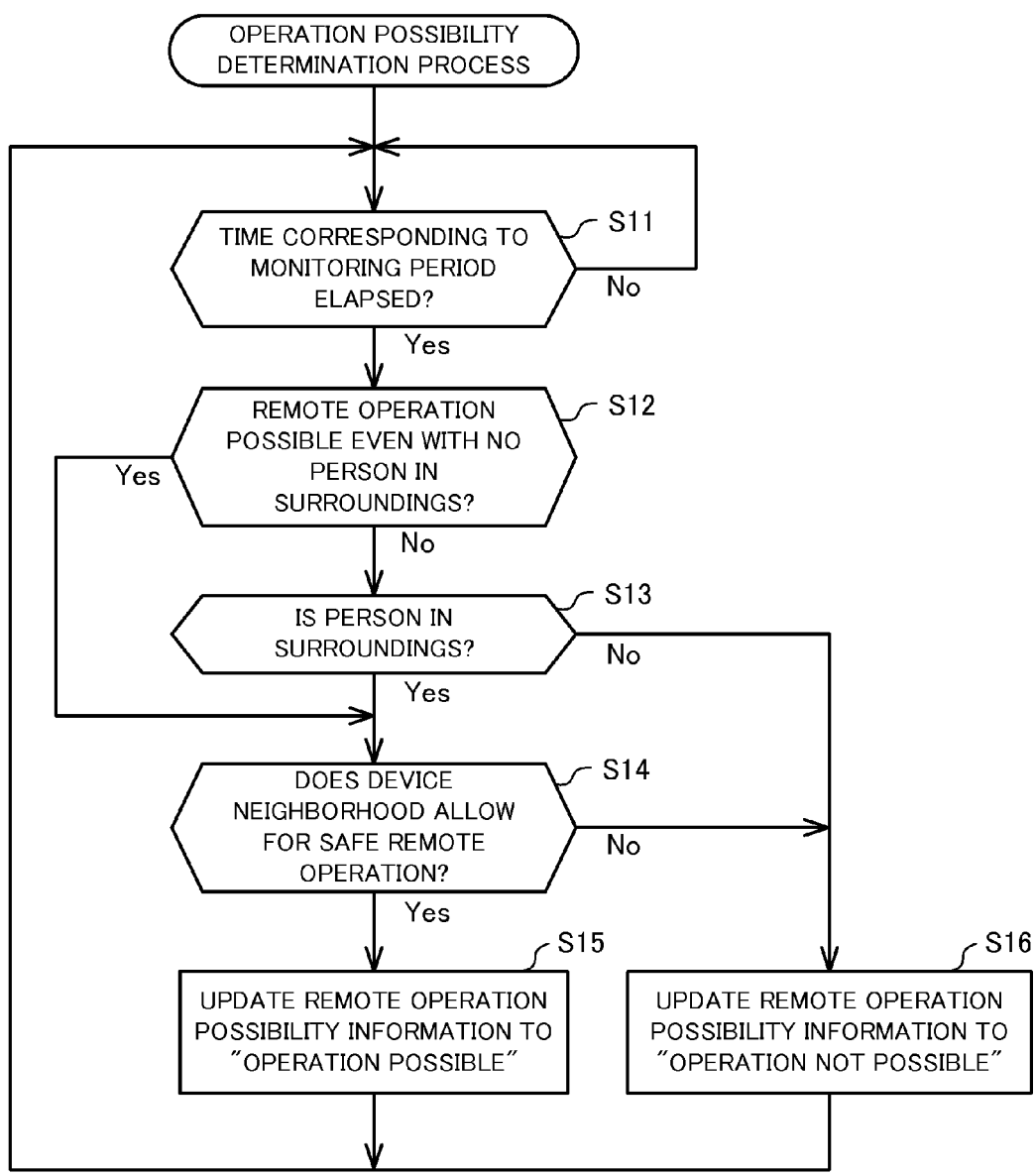
FIG. 6 is a flowchart showing the sequence of an operation possibility determination process.

To begin, the actions of the operation possibility determination process executed by the operation possibility determiner 372 of the controller 37 are explained with reference to the flowchart in FIG. 6. This operation possibility determination process is repeatedly executed with the set monitoring period for each device 4 while the power supply of the device control apparatus 3 is on.

First, the operation possibility determiner 372 determines whether or not the time according to the monitoring period of the device 4 that is the target of the process (hereafter referred to as the device 4) has elapsed, with reference to the device database 361 (step S11).

When the time corresponding to the monitoring period has elapsed (step S11: Yes), the operation possibility determiner 372 determines whether or not the device 4 can be remotely operated even if no person is present in the surroundings (step S12). For example, the operation possibility determiner 372 references the monitoring sensor ID of the device database 361 and, when a human presence sensor is not included in the environment acquisition sensors 5 for monitoring the device 4, may determine that remote operation is possible even if no person is present. The process of step S12 does not necessarily need to be executed, and when the time corresponding to the monitoring period has elapsed (step S11: Yes), it would be fine to move to the process of step S13.

When it is determined that remote operation is not possible when no person is present in the surroundings (step S12: No), the operation possibility determines 372 determines whether or not a person is present in the surroundings of the device 4 (step S13). Specifically, the operation possibility determiner 372 references the environment database 362, acquires the detection results of a human presence sensor set as the environment acquisition sensor 5 for monitoring the device 4, and may determine the absence or presence of a person from these detection results.

On the other hand, when it is determined that remote operation is possible even when no person is present in the surroundings of the device 4 (step S12: Yes), or when it is determined that a person is present in the surroundings of the device 4 for which it was determined that remote operation is not possible when a person is not present (step S13: Yes), the operation possibility determiner 372 determines whether or not the device 4 can be remotely operated safely, on the basis of the surrounding environment acquired by the environment acquisition sensors 5 for monitoring the device 4 (step S14).

Specifically, the operation possibility determiner 372 specifies an environment acquisition sensor 5 for monitoring the device 4, with reference to the monitoring sensor IDs of the device database 361. Then, the operation possibility determiner 372 acquires the environment information acquired by the specified environment acquisition sensor 5, from the environment database 362. Then, the operation possibility determiner 372 may determine whether or not the device 4 can be remotely operated safely, on the basis of the acquired environment information.

For example, when the specified environment acquisition sensor 5 for monitoring is a camera, the operation possibility determiner 372 analyzes images photographed by the camera and stored in the environment database 362, and determines whether or not foreign objects of at least a prescribed size are present in the surroundings of the device 4. Then, when a foreign object is present, the operation possibility determiner 372 may determine that the device 4 cannot be remotely operated safely. The determination of the absence or presence of foreign objects may be accomplished, for example, by storing images of the normal usage status of the device 4 in the data memory device 36 in advance and detecting differences from the image photographed this time.

Or, when the specified environment acquisition sensor 5 for monitoring is a heat sensor, the operation possibility determiner 372 may determine that the device 4 can be remotely operated safely when the value of the temperature measured by the heat sensor and stored in the environment database 362 is within a prescribed range.

Or, when multiple environment acquisition sensors 5 for monitoring the device 4 are established, the operation possibility determiner 372 may determine compositely whether or not remote operation is possible from the environment information acquired by the various environment acquisition sensors 5.

For example, consider a case in which the environment acquisition sensors 5 for monitoring are a camera and a heat sensor. In this case, the operation possibility determiner 372 computes multi-step indicators (for example, indicators 1-5) in accordance with the size of foreign objects near the device 4 that have been detected by analyzing an image photographed by the camera. In addition, the operation possibility determiner 372 computes multi-step indicators (for example, indicators 1-5) in accordance with the temperature value measured by the heat sensor. Then, the operation possibility determiner 372 may determine that remote control is possible when the sum of the two indicators calculated in this manner is less than 3, and may determine that remote control is not possible when the sum is 3 or greater.

Returning to FIG. 6, when it has been determined that it is possible to remotely operate the device 4 safely (step S14: Yes), the operation possibility determiner 372 updates the remote operation possibility information for the device 4 set in the device database 361 to "operation possible" (step S15). Then, the process returns to step S11 and the operation possibility determiner 372 repeats the process of determining whether or not the device 4 can be remotely operated safely with a monitoring period in accordance with each device 4, and updating the operation possibility information (step S11 to step S15).

When it is determined that no person is present surrounding the device 4 for which it was determined that remote operation is not possible when no person is present (step S13: No), or when it is determined that the device 4 cannot be remotely operated safely (step S14: No), the operation possibility determiner 372 updates the remote operation possibility information for the device 4 set in the device database 361 to "operation not possible" (step S16). Then, the process returns to step S11 and the operation possibility determiner 372 repeats the process of determining whether or not the device 4 can be remotely operated safely with a monitoring period in accordance with each device 4, and updating the operation possibility information (step S11 to step S15).

(Device Control Process)

Next, the actions of a device control process executed by the device controller 373 of the controller 37 are explained.

Figure 7:
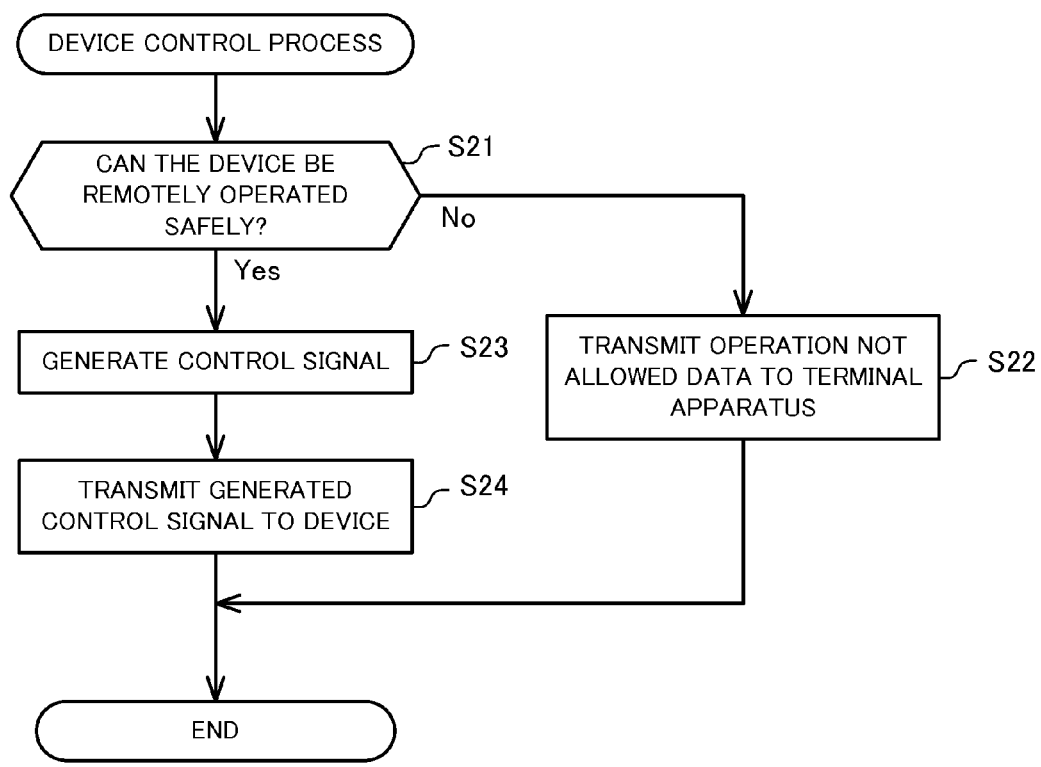
FIG. 7 is a flowchart showing the sequence of a device control process.

A user operates the input device 23 of the terminal apparatus 2 while away from home, and designates the device 4 to be the operation target and the operation contents for the device 4. Whereupon, the controller 25 of the terminal apparatus 2 generates information (for example, the device address) indicating the designated device 4 that is the target of operation and remote control command data containing the designated operation contents, and transmits such to the device control apparatus 3 via the communicator 21. When the remote operation command data is received by the terminal communicator 31 of the device control apparatus 3, the device controller 373 executes the device control process shown in the flowchart in FIG. 7.

First, the device controller 373 references the remote operation possibility information in the device database 361 and determines whether or not the device 4 that is the target of operation (hereafter, the device 4) indicated by the received remote operation command data can be remotely operated safely (step S21).

When it is determined that the device 4 cannot be remotely operated safely (step S21: NO), the device controller 373 transmits data to that effect (operation impermissible data) to the terminal apparatus 2 (step S22). The controller 25 of the terminal apparatus 2 that has received this operation impermissible data displays on the display device 22 an error message and/or the like conveying to the user that the desired remote operation is not possible for the designated device 4.

On the other hand, when it is determined that the device 4 can be remotely operated safely (step S21: Yes), the device controller 373 generates a control signal for controlling the device 4, on the basis of the operation contents indicated by the remote operation command data received (step S23). Then, the device controller 373 transmits the generated control signal to the device 4 (step S24). The device 4 that has received this control signal accomplishes actions in accordance with the contents indicated by the control signal, that is to say, the operation command contents from the terminal apparatus 2. With this, the device control process ends.

As explained above, with the remote control system 1 according to the first exemplary embodiment of the present disclosure, a determination is made as to whether or not the device 4 can be remotely operated safely, on the basis of the environment near the device 4. Then, it is possible to remotely operate the device 4 from the terminal apparatus 2 only for a device 4 for which it has been determined that remote operation is safely possible. Accordingly, it is possible to remotely operate the device 4 safely.

In addition, with the remote control system 1 according to the first exemplary embodiment of the present disclosure, the device control apparatus 3 determines whether or not the device 4 can be remotely operated safely at fixed intervals and updates the remote operation possibility information. Accordingly, when remote operation of the device 4 is commanded from the terminal apparatus 2, it is possible for the device control apparatus 3 to promptly determine whether or not remote operation of the device 4 is possible by referring to the remote operate possibility information of the device 4. Accordingly, it is possible to shorten the time needed to confirm safety when a command for remote operation of the device 4 is received.

In addition, with the remote control system 1 according to the first exemplary embodiment of the present disclosure, the device control apparatus 3 determines whether or not the device 4 can be remotely operated safely for a monitoring period that is longer the greater the safety level of the device 4 is. Accordingly, it is possible to efficiently determine whether or not remote operation of the device 4 is possible in accordance with the safety of the device 4, so it is possible to reduce the burden needed for processes of the device control apparatus 3.

(Second Exemplary Embodiment)

Next, a remote control system 1A according to a second exemplary embodiment of the present disclosure will be described. In the explanation below, constituent elements in common with the first exemplary embodiment of the present disclosure are labeled with the same reference signs, and explanation is omitted here.

Figure 8:
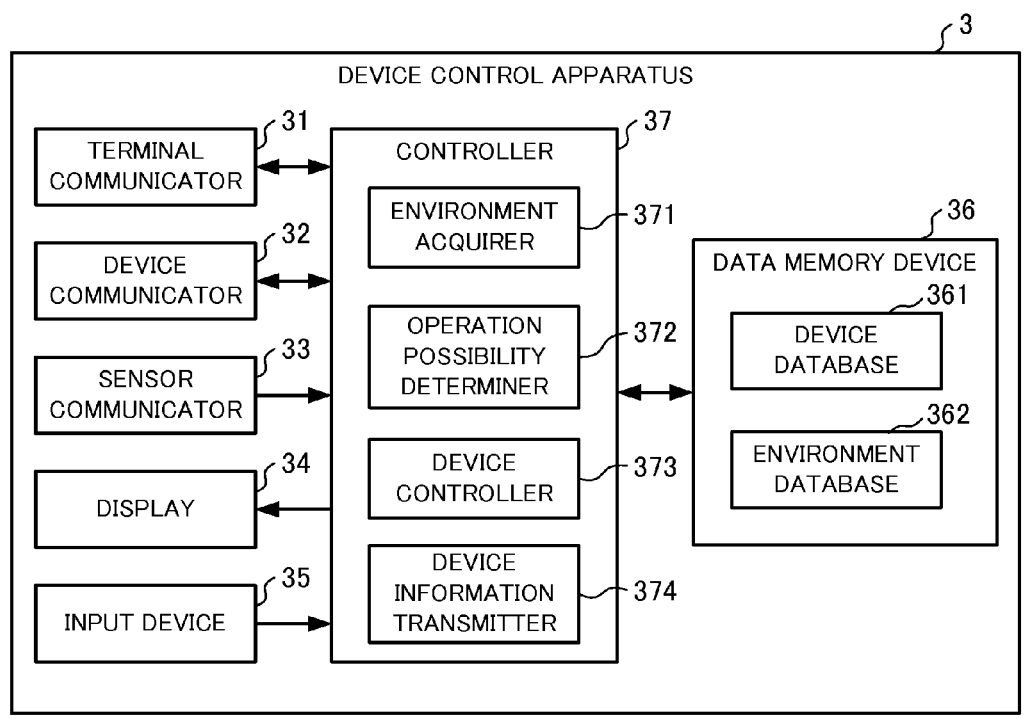
FIG. 8 is a block diagram showing the composition of a device control apparatus according to a second exemplary embodiment.

The entire composition of the remote control system 1A according to the second exemplary embodiment is substantially identical to that of the remote control system 1 according to the first exemplary embodiment, as shown in FIG. 1. As shown in FIG. 8, the remote control system 1A is such that the controller 37 of the device control apparatus 3 further comprises a device information transmitter 374.

The device information transmitter 374 executes a device information transmission process for transmitting device information related to each device 4 to the terminal apparatus 2, via the terminal communicator 31.

Figure 9:
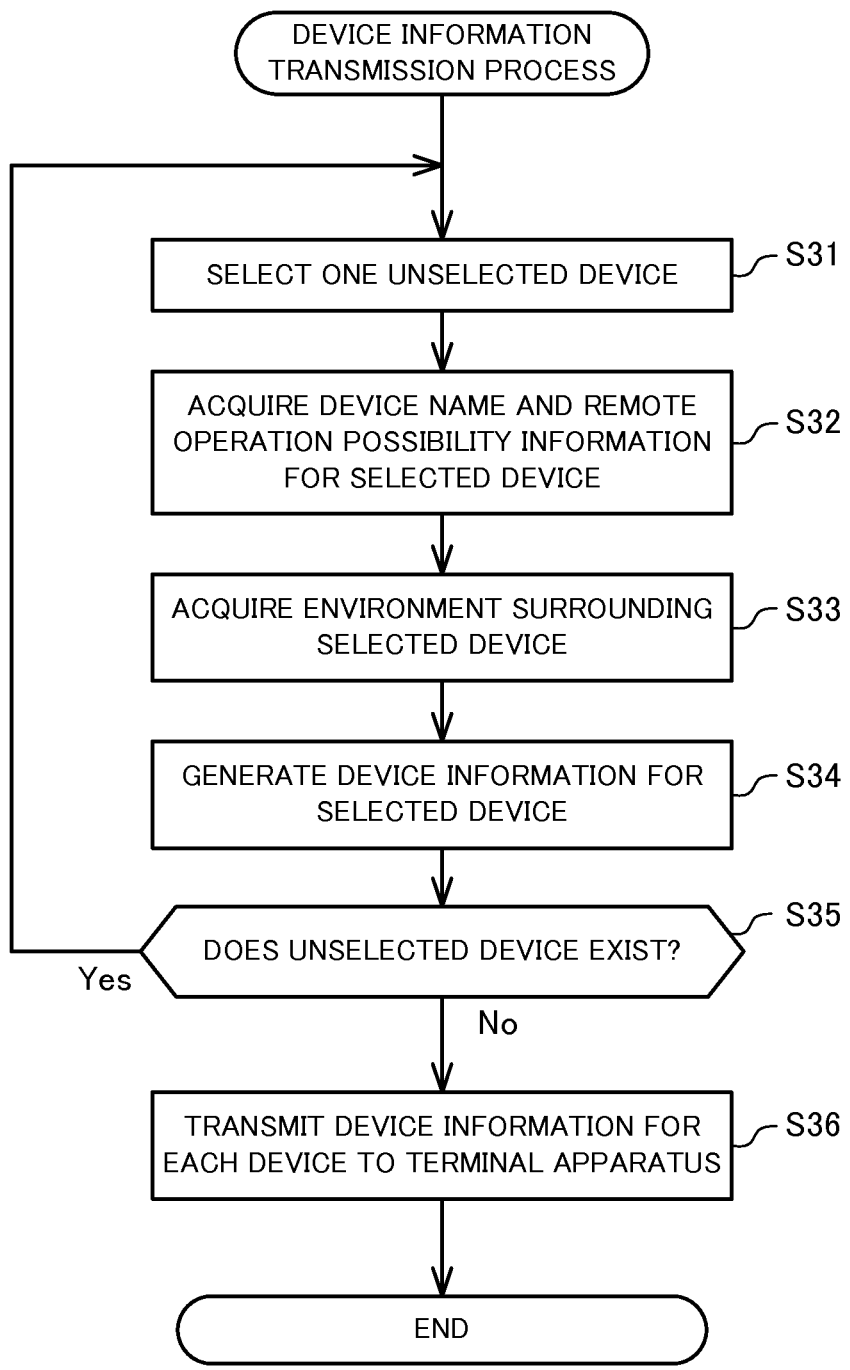
FIG. 9 is a flowchart showing the sequence of a device information transmission process.

Next, the actions of the device information transmission process are described with reference to the flowchart in FIG. 9. The device information transmission process is repeatedly executed each prescribed time interval (for example, each minute). It would also be fine to execute the device information transmission process only when there is a command from the terminal apparatus 2.

First, the device information transmitter 374 selects one device 4 that has not yet been selected in the device information transmission process this time (step S31).

Next, the device information transmitter 374 acquires, from the device database 361, the device name and remote operation possibility information for the device 4 that was selected (hereafter called the selected device 4) (step S32).

Next, the device information transmitter 374 specifies an environment acquisition sensor 5 for monitoring the selected device 4, by referencing the monitoring sensor IDs of the device database 361. Then, the device information transmitter 374 acquires from the environment database 362 the environment information acquired by the specified environment acquisition sensor 5, as the environment surrounding the selected device 4 (step S33).

Next, the device information transmitter 374 generates device information including the device name and remote operation possibility information for the selected device 4 acquired in step S32, and the environment information acquired in step S33 (step S34).

Next, the device information transmitter 374 determines whether or not there is a device 4 that has not been selected in step S31 (step S35). When there is an unselected device 4 (step S35: Yes), the device information transmitter 374 selects this device 4 and repeats the process of generating the device information (step S31 to step S34).

When there is no unselected device 4 (step S35: No), the device information transmitter 374 transmits the device information of each device 4 to the terminal apparatus 2 via the terminal communicator 31 and the external network N2 (step S36). With this, the device information transmission process ends.

The controller 25 of the terminal apparatus 2 stores the device information for each device 4 received from the device control apparatus 3 via the communicator 21 in the data memory device 24. When the device information of each device 4 is already stored in the data memory device 24, the controller 25 updates this to the device information received this time. Then, the controller 25, in response to a display request for device information from a user via the input device 23, reads the device information from the data memory device 24, generates screen data for a device information display screen as shown in FIG. 10 on the basis of the device information read, and causes this to be displayed on the display 22.

As explained above, with the remote control system 1A according to the second exemplary embodiment of the present disclosure, a user of the terminal apparatus 2 becomes able to easily confirm from a remote location the operation possibility information and surrounding environment of the device 4 that is the target of remote operation. Accordingly, the user becomes able to understand why the device 4 cannot be operated remotely, from the confirmed surrounding environment, and to easily know that the device 4 is in a dangerous state.

The above-described device information transmission process may be executed with the timing with which the remote operation possibility information is updated to operation being not possible. By so doing, it becomes possible for the user to promptly confirm that the device 4 is in a dangerous state.

In addition, with the above-described device information transmission process, device information including the remote operation possibility information and information indicating the surrounding environment was generated and transmitted to the terminal apparatus 2, but it would be fine to generate device information including only one of these types of information and to transmit such to the terminal apparatus 2.

The present disclosure is not limited to the above-described exemplary embodiments, for various modifications are naturally possible in sections that do not deviate from the gist of the present disclosure.

For example, with the above-described exemplary embodiments, a human presence sensor, a heat sensor and a camera were illustrated as examples of environment acquisition sensors 5, but the type of environment acquisition sensor 5 is not limited to this. For example, it would be fine to make a seismic sensor, a humidity sensor, a gas sensor and/or the like an environment acquisition sensor 5.

In addition, the device control apparatus 3 may be linked to and control related devices 4, even when there is one device 4 for which remote operation is commanded from the terminal apparatus 2. For example, when turning on the air conditioner is commanded from the terminal apparatus 2, the device control apparatus 3 may accomplish control not just to turn on the air conditioner but also to close windows or curtains, and/or the like.

In addition, in the above-described exemplary embodiments, the time of the monitoring period for determining whether or not remote operation is possible was established in accordance with safety level. However, it would be fine to establish the number of environment measurement sensors 5 for acquiring the environment surrounding the devices 4 in accordance with the safety level, for example. By so doing, it is possible to acquire the environment surrounding the devices 4 with more environment measurement sensors 5 the higher the danger level of a device 4 (the lower the safety level of the device 4) is, thereby making it possible to more efficiently determine whether or not remote operation of the device 4 is possible.

In addition, the controller 37 of the device control apparatus 3 may accomplish a process of lowering the safety level in the device database 361 and accordingly shortening the monitoring period in accordance with the number of days elapsed from the manufacturing date of the device 4, for each prescribed interval (for example, each week). By so doing, it is possible to further increase safety by shortening the period for determining whether or not remote operation is possible the older the device 4 becomes.

In addition, in the above-described exemplary embodiments, data communication was accomplished wirelessly between the terminal apparatus 2 and the device control apparatus 3, but it would be fine to accomplish data communications by wires via a prescribed communication line.

In addition, the terminal apparatus 2 is not limited to a mobile apparatus. For example, it would be fine for the terminal apparatus 2 to be in a prescribed location, such as embedded in a wall of the residence 6, and/or the like.

In addition, a user can remotely operate each device 4 not just by operating the terminal apparatus 2 but also by operating the input device 35 of the device control apparatus 3. In this case as well, similar to the case of operating the terminal apparatus 2, whether or not the device 4 can be operated safely is determined by the device controller 373 (FIG. 7, step S21), and control of the device 4 is accomplished on the basis of this determination result.

In addition, in the above-described exemplary embodiments, the device control apparatus 3 determined whether or not the device 4 can be remotely operated safely on the basis of the environment surrounding the device 4 as acquired by the environment acquisition sensors 5. However, it would be fine for the above-described determination to be made on the basis of various information by the device control apparatus 3. For example, it would be fine to determine whether or not the device 4 is running normally from the working status of the device 4, and to determine that remote operation is not possible when the determination is that the device 4 is running abnormally.

In addition, in the above-described exemplary embodiments, in the device control process no control was accomplished on the device 4 when it was determined that the device 4 that is the target of commands cannot be remotely operated safely. However, even when it is determined that remote operation is not possible, it would be fine to accomplish control that changes the operation in the direction of lowering the capabilities of the device 4 (for example, an operation turning off the power supply) rather than the operation requested from the terminal apparatus 2.

In addition, it would be fine for the remote control systems 1 and 1A in the above-described exemplary embodiments to be integrated into a HEMS (Home Energy Management System). In this case, it would be fine to have a composition in which the functions of the device control apparatus 3 in the above-described exemplary embodiments are absorbed by the controller of the HEMS.

In addition, in the above-described exemplary embodiments, it is possible to cause an existing personal computer (PC), mobile terminal and/or the like to function as the device control apparatus 3 according to the present disclosure by applying the programs respectively executed by the device control apparatus 3 to the PC, mobile terminal and/or the like.

The method of distributing such programs is arbitrary, and for example it would be fine to store and distribute the programs on a computer-readable memory medium, such as a CD-ROM (Compact Disk Read-Only Memory), DVD (Digital Versatile Disk), MO (Magneto Optical Disk), memory card and/or the like, or to distribute the programs via a communication network such as the Internet and/or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be appropriately applied to a system for managing devices in a residence.

REFERENCE SIGNS LIST 1, 1A Remote control system
2 Terminal apparatus
3 Device control apparatus
4 Device
5 Environment acquisition sensor
6 Residence
21 Communicator
22, 34 Display
23, 35 Input device
24, 36 Data memory device
25, 37 Controller
31 Terminal communicator
32 Device communicator
33 Sensor communicator
361 Device database
362 Environment database
371 Environment acquirer
372 Operation possibility determiner
373 Device controller
374 Device information transmitter
N1 In-house network
N2 External network

The invention claimed is:

1. A remote control system comprising a terminal apparatus and a device control apparatus, wherein:
the terminal apparatus comprises:
a communicator configured to accomplish data communication conforming to a prescribed communication format with the device control apparatus;
an operation receiver configured to receive remote operation from a user for one device of a plurality of devices placed in a residence; and
an operation command data transmitter configured to transmit remote operation command data including command contents indicating the remote operation received by the operation receiver to the device control apparatus via the communicator; and
the device control apparatus comprises:
a terminal communicator configured to accomplish data communication conforming to a prescribed communication format with the terminal apparatus;
a device communicator configured to accomplish with the plurality of devices via a prescribed network;
an environment acquirer configured to acquire environments surrounding the plurality of devices;
an operation possibility determiner configured to determine, periodically at observation intervals that are set differently according to the device, whether safe remote operation of the device is possible and store results of the determination, on the basis of the environment acquired by the environment acquirer, for each device of the plurality of devices; and
a device controller configured to transmit a control signal to the one device via the device communicator on the basis of the command contents included in the remote operation command data received, based on the stored results of the determination when the operation possibility determiner determines that remote operation of the one device is possible upon the terminal communicator receiving the remote operation command data for the terminal apparatus, and to not transmit the control signal when the operation possibility determiner determines that remote operation is not possible.

2. The remote control system according to claim 1, wherein:
the observation interval is set at a time interval in accordance with a safety level of the device, for each device.

3. The remote control system according to claim 1, wherein the device control apparatus further comprises:
a device information transmitter configured to transmit device information including at least one out of information indicating whether remote operation of the device is safe and information indicating the environment surrounding the device, for each device of the plurality of devices to the terminal apparatus via the terminal communicator.

4. A device control apparatus, comprising:
a terminal communicator configured to accomplish data communication conforming to a prescribed communication format with a terminal apparatus;
a device communicator configured to accomplish data communication with a device of a plurality of devices located in a residence via a prescribed network;
an environment acquirer configured to acquire environments surrounding the plurality of devices;
an operation possibility determiner configured to determine, periodically at observation intervals that are set differently according to the device, whether safe remote operation of the device is possible and store results of the determination, on the basis of the environment acquired by the environment acquirer, for each device of the plurality of devices; and
a device controller configured to transmit a control signal to one device of the plurality of devices via the device communicator on the basis of command contents included in the remote operation command data received, based on the stored results of the determination when the operation possible determiner determines that remote operation of the one device is possible upon remote operation command data including command contents for remote operation for the device from the terminal apparatus via the terminal communicator, and to not transmit the control signal when the operation possibility determiner determines that remote operation is not possible.

5. A non-transitory computer-readable recording medium that stores a program configured to cause a computer to function as:
a terminal communicator configured to accomplish data communication conforming to a prescribed communication format with a terminal apparatus;
a device communicator configured to accomplish data communication with a plurality of devices located in a residence via a prescribed network;
an environment acquirer configured to acquire environments surrounding the plurality of devices;
an operation possibility determiner configured to determine, periodically at observation intervals that are set differently according to the device, whether safe remote operation of the device is possible and store results of the determination, on the basis of the environment acquired by the environment acquirer, for each device of the plurality of devices; and
a device controller configured to transmit a control signal to one device of the plurality of devices via the device communicator on the basis of command contents included in the remote operation command data received, based on the stored results of the determination when the operation possibility determiner determines that remote operation of the one device is possible upon remote operation command data including command contents for remote operation for the device from the terminal apparatus via the terminal communicator, and to not transmit the control signal when the operation possibility determiner determines that remote operation is not possible.

6. A device control method, comprising:
acquiring environments surrounding a plurality of devices located in a residence;
determining, periodically at observation intervals that are set differently according to the device, whether safe remote operation of the device is possible and store results of the determination, on the basis of the acquired environment, for each device of the plurality of devices;
receiving remote operation command data including command contents for remote operation of one device of the plurality of devices, and if safe operation is determined to be possible for the one device based on the stored results of the determination, transmitting a control signal based on command contents included in the received remote operation command data, and if safe operation is determined not to be possible, not transmitting the control signal.

7. The remote control system according to claim 1, wherein the device controller is further configured, upon receiving the remote operation command data, if the remote operation of the one device is not possible, to send to the terminal apparatus operation refusal data indicating the inability of remote operation.

8. The remote control system according to claim 1, wherein the operation possibility determiner is further configured, if the device is incapable of remote operation if a person is not present in a vicinity for the device of the plurality of devices,
  to determine whether the person is present in the vicinity of the device,
  to determine that the device is incapable of safe remote operation if the person is determined to be absent, and
  to determine that the device is capable of safe remote operation if the person is determined to be present.

9. The device control apparatus according to claim 4, wherein:
  the observation interval is set at a time interval in accordance with a safety level of the device, for each device.

10. The device control apparatus according to claim 4, wherein the operation possibility determiner is further configured, if the device is incapable of remote operation if a person is not present in a vicinity for the device of the plurality of devices,
  to determine whether the person is present in the vicinity of the device,
  to determine that the device is incapable of safe remote operation if the person is determined to be absent, and
  to determine that the device is capable of safe remote operation if the person is determined to be present.

11. The non-transitory computer-readable recording medium according to claim 5, wherein:
  the observation interval is set at a time interval in accordance with a safety level of the device, for each device.

12. The non-transitory computer-readable recording medium according to claim 5, wherein the operation possibility determiner is further configured, if the device is incapable of remote operation if a person is not present in a vicinity for the device of the plurality of devices,
  to determine whether the person is present in the vicinity of the device,
  to determine that the device is incapable of safe remote operation if the person is determined to be absent, and
  to determine that the device is capable of safe remote operation if the person is determined to be present.

13. The device control method according to claim 6, further comprising:
  setting the observation interval at a time interval in accordance with a safety level of the device, for each device.

14. The device control method according to claim 6, further comprising, if the device is incapable of remote operation if a person is not present in a vicinity for the device of the plurality of devices,
  determining whether the person is present in the vicinity of the device,
  determining that the device is incapable of safe remote operation if the person is determined to be absent, and
  determining that the device is capable of safe remote operation if the person is determined to be present.

* * * * *